Patented Oct. 3, 1944

2,359,311

UNITED STATES PATENT OFFICE 2,359,311

PROCESS FOR THE PRODUCTION OF ACETOXY COUMARANES AND CHROMANES

Otto Hromatka, Darmstadt, Germany, assignor to Merck & Co., Inc., Rahway, N. J., a corporation of New Jersey No Drawing. Application May 29, 1941, Serial No. 395,837. In Germany July 1, 1940

4 Claims. (Cl. 260—333)

This invention relates to improved processes for the production of derivatives of tocopherols.

Previously, 5-acetoxy coumaranes and 6-acetoxy chromanes, including the therapeutically important substance, acetyl-d,l-α-tocopherol, have been prepared by acetylation of the corresponding hydroxy compounds. However, that process has the disadvantage that the hydroxy compounds are extremely sensitive to air.

I have discovered that 5-acetoxy coumaranes and 6-acetoxy chromanes may be prepared without the intermediate production of the corresponding hydroxy compounds.

According to one embodiment of my invention, 5-amino coumaranes or 6-amino chromanes are utilized as starting materials. Diazonium salts of the amino coumaranes and chromanes are treated with acetic acid or substances easily hydrolyzable to acetic acid, such as acetic anhydride. A practical method of carrying out this invention is to diazotize the amino compounds in acetic acid solution. The reaction mixture is warmed, and formation of the acetoxy compound, in almost quantitative yield, takes place readily.

According to another embodiment of my invention, it is possible to utilize p-amino phenols or alkyl substituted p-amino phenols, all having an unsubstituted position ortho to the hydroxyl group, as starting materials. These are diazotized in acetic acid solution, or their diazonium salts are treated with acetic acid and/or acetic anhydride. The mono-acetyl hydroquinones thus produced are converted to acetoxy coumaranes or chromanes by condensation with allylic alcohols of the formula $$R_1R_2C=CH-CH_2OH$$ 

where $R_1$ and $R_2$ are hydrogen or alkyl radicals, or derivatives of such alcohols, suitable for coumarane or chromane synthesis.

It has previously been attempted to produce mono-acetyl hydroquinones by partial acetylation of the hydroquinones. However, that process resulted in only a small yield of the mono-acyl compounds being formed, together with quantities of the diacyl compound. Furthermore, the direct partial acetylation process can not be used for the production of mono-acetates of hydroquinones in which, as is the case with a compound of the following formula

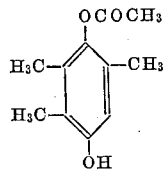

used as starting material for the production of acetyl-d,l-α-tocopherol, the acetylated OH stands in sterically obstructed position para to the mono-acetyl OH group; for instance, see the article by Von Werder, Moll & Jung, in Hoppe-Seylers Zeits. fur physiol. Chemie, vol. 257 (1939), page 133.

My improved process avoids the disadvantages of the prior art, and the mono-acetyl hydroquinones are obtained from p-amino phenols uncontaminated by diacyl hydroquinones. It could not be expected that substitution of the amino group of p-amino phenols by an acetoxy group could be effected smoothly by diazotization in acetic acid solution or treatment of the diazonium salts with acetic acid. It is known that the substitution of a diazonium group for other groups in amino phenols is difficult to effect (Houben-Weyl, Die Methoden der organischen Chemie, 2nd ed., vol. 4, page 617, et seq.).

The following examples illustrate methods of carrying out the present invention, but it is to be understood that these examples are given by way of illustration, and not of limitation.

*Example I*

2.0 gm. of 2,4,6,7-tetramethyl-6-amino-coumarane-hydrochloride are converted into the base by means of soda solution, the base is extracted with ether and isolated by evaporation of the solvent.

The base is dissolved in 20 cc. of glacial acetic acid and the solution cooled to 8–10°. Thereafter, 0.7 gm. of very finely pulverized sodium nitrite are added in small quantities. The final point of the reaction is determined by spotting on potassium iodide-starch paper. The clear solution is heated on a steam bath until a brisk evolution of nitrogen sets in. After termination of the latter the acetic acid is distilled off in vacuo and the residue digested with ice water and ether. By precipitation with sodium bicarbonate solution, the last traces of acetic acid are removed. By evaporation of the ether solution 2,4,6,7-tetramethyl-5-acetoxy-coumarane is obtained.

The yield is 87.5% of theory after purification of the compound by recrystallization or by chromatographing. M. P. 74°.

*Example II*

0.80 gm. of 2,5,7,8-tetramethyl-2(4',8',12'-trimethyl-tridecyl)-6-aminochromane are dissolved in 12 cc. glacial acetic acid and cooled with ice-water. After the addition of 0.14 gm. of pulverized sodium nitrite, the solution is heated on the steam bath until the nitrogen evolution is completed. Thereupon, ice-water and ether are added and the liquid layers separated. For removing the acetic acid the ether solution is precipitated several times with water and finally with sodium bicarbonate solution, followed by drying and evaporation. Yield, 0.83 gm.

The residue is dissolved in petroleum ether and chromatographed on an aluminum oxide column according to Brockmann (35 times as much $Al_2O_3$ as the weight of the residue). After separation of a very small yellow zone at the upper end of the column, the d,l-α-acetyl tocopherol is eluted with ether. The residue after evaporation of the ether solutions consists of the pure substance. The yield is 0.70 gm.

The identity of the product with d,l-α-acetyl tocopherol was ascertained by the determination of the refraction index: $n^{20}=1.4984$, of the adsorption spectrum of a feinsprit solution ($c^D=0.02$): Maxima 284 and 278 $m\mu$, minimum 255 $m\mu$, and by microanalysis.

*Example III*

15.1 gm. of 3-amino-6-hydroxy-1,2,4-trimethyl-benzene in 100 cc. of glacial acetic acid are mixed with 6.9 gm. of sodium nitrite in small portions under stirring at 10–15°. When the solution becomes clear, it is heated to 90° until the evolution of nitrogen is concluded. The glacial acetic acid is distilled off in vacuo and the residue dissolved in ether and water. The layers are separated and the ether solution precipitated with sodium bicarbonate solution until the last traces of acetic acid are removed. After drying and evaporation of the ether solution, a residue remains which is purified by distillation in vacuo of 0.5 mm. Hg. By solution of the distillate in little ether and precipitation with petroleum ether, colorless crystals of 3-acetoxy-6-hydroxy-1,2,4-trimethylbenzene are obtained melting at 108°.

3.9 gm. of 3-acetoxy-6-hydroxy-1,2,4-trimethyl-benzene and 1.6 gm. of anhydrous zinc chloride in 12 cc. of glacial acetic acid are dissolved by heating under reflux. In the course of a half hour, 6.0 gm. of phytol are added to the boiling solution and the heating continued for another one and a half hours. After cooling, the reaction product is dissolved in ether. The ether solution is washed several times with ice water and then with sodium bicarbonate solution, dried over magnesium sulfate and evaporated. The oily residue is dissolved in petroleum ether, and chromatographed on aluminum oxide according to Brockmann. A colored zone at the upper end of the column is removed; the remaining column is eluted with ether. The d,l-acetyl-α-tocopherol obtained after evaporation of the ether solution may be distilled once more in high vacuo.

The identity of the product with d,l-acetyl-α-tocopherol was proved by determining C, H and acetyl, also by the conversion of the d,l-α-tocopherol, formed in the saponification, into the crystallized 3,5-dinitrobenzo-acid-ester melting at 66°.

In place of the allylic alcohol specifically shown in Example III, other allylic alcohols may be substituted, or derivatives thereof, such as the allylic halides of the type of phytyl bromide. Thus, the 3-acetoxy-6-hydroxy-1,2,4-trimethyl-benzene may be treated with phytyl bromide and zinc chloride, in benzene solution, at 70° C. The resultant reaction product may be purified by chromatographic adsorption to aluminum oxide.

Modifications may be made in carrying out the present invention, without departing from the spirit and scope thereof, and I am to be limited only by the appended claims.

I claim:
1. The process for preparing acetoxy compounds of the class consisting of 5-acetoxy coumaranes and 6-acetoxy chromanes comprising diazotizing a substance selected from the group consisting of 5-amino coumaranes and 6-amino chromanes in a medium selected from the group consisting of acetic acid and acetic anhydride, and thereafter heating the reaction mixture.

2. In a process for the production of acetoxy compounds of the class consisting of 5-acetoxy coumaranes and 6-acetoxy chromanes, the step comprising diazotizing a substance selected from the group consisting of 5-amino coumaranes and 6-amino chromanes in a medium selected from the group consisting of acetic acid and acetic anhydride.

3. The process comprising diazotizing an acetic acid solution of 2,4,6,7-tetramethyl-5-amino coumarane and recovering 2,4,6,7-tetramethyl-5-acetoxy coumarane.

4. The process comprising diazotizing an acetic acid solution of 2,5,7,8-tetramethyl-2(4′,8′,12′-trimethyl-tridecyl)-6-amino chromane and recovering 2,5,7,8-tetramethyl-2(4′,8′,12′-trimethyl-tridecyl)-6-acetoxy chromane.

OTTO HROMATKA.